US007057670B2

(12) United States Patent
Kikinis

(10) Patent No.: US 7,057,670 B2
(45) Date of Patent: Jun. 6, 2006

(54) CURSOR CONTROL SYSTEM

(76) Inventor: Dan Kikinis, 20264 Ljepava Dr., Saratoga, CA (US) 95070

( * ) Notice: Subject to any disclaimer, the term of this patent is extended or adjusted under 35 U.S.C. 154(b) by 982 days.

(21) Appl. No.: 09/844,642

(22) Filed: Apr. 27, 2001

(65) Prior Publication Data

US 2002/0005910 A1   Jan. 17, 2002

Related U.S. Application Data

(60) Provisional application No. 60/200,817, filed on Apr. 27, 2000.

(51) Int. Cl.
*H04N 9/76* (2006.01)
*H04N 5/44* (2006.01)
*H04N 5/445* (2006.01)
*H04N 7/173* (2006.01)
*H04N 7/16* (2006.01)
*G06F 13/00* (2006.01)
*G06F 3/00* (2006.01)

(52) U.S. Cl. .................. 348/601; 348/734; 725/38; 725/39; 725/131; 725/139; 725/151

(58) Field of Classification Search ............... 725/38, 725/39, 131, 133, 139, 141, 151, 153; 348/601, 348/734; 345/158; 340/825.69, 825.72
See application file for complete search history.

(56) References Cited

U.S. PATENT DOCUMENTS

| 4,621,259 A | 11/1986 | Schepers et al. |
| 5,243,418 A | 9/1993 | Kuno et al. |
| 5,414,773 A | 5/1995 | Handelman |
| 5,479,268 A | 12/1995 | Young et al. |
| 5,485,197 A | 1/1996 | Hoarty |
| 5,532,754 A | 7/1996 | Young et al. |
| 5,550,576 A | 8/1996 | Klosterman |
| 5,684,525 A | 11/1997 | Klosterman |
| 5,704,837 A | 1/1998 | Iwasaki et al. |
| 5,724,492 A | 3/1998 | Matthews, III et al. |
| 5,737,028 A | 4/1998 | Bertram et al. |
| 5,751,282 A | 5/1998 | Girard et al. |
| 5,808,613 A | 9/1998 | Marrin et al. |
| 5,818,441 A | 10/1998 | Throckmorton et al. |
| 5,828,945 A | 10/1998 | Klosterman |
| 5,841,563 A | 11/1998 | Effenberger |
| 5,900,915 A | 5/1999 | Morrison |
| 5,923,362 A | 7/1999 | Klosterman |
| 5,926,168 A | 7/1999 | Fan |
| 5,929,849 A | 7/1999 | Kikinis |
| 5,940,073 A | 8/1999 | Klosterman et al. |
| 5,956,456 A | 9/1999 | Bang et al. |
| 5,977,964 A | 11/1999 | Williams et al. |

(Continued)

FOREIGN PATENT DOCUMENTS

JP   410093880 A   4/1998

(Continued)

*Primary Examiner*—Vivek Srivastava
*Assistant Examiner*—Joseph G. Ustaris
(74) *Attorney, Agent, or Firm*—Todd S. Parkhurst; Holland & Knight, LLP

(57) ABSTRACT

A method and apparatus for a novel cursor control system is disclosed. In one embodiment, the invention is a method of manipulating a cursor on a tv screen utilizing a wireless remote control. The method includes detecting a location on the screen pointed to by the remote control. The method also includes Transmitting the location to a set-top box.

4 Claims, 8 Drawing Sheets

U.S. PATENT DOCUMENTS

| | | |
|---|---|---|
| 5,999,167 A | 12/1999 | Marsh et al. |
| 5,999,187 A | 12/1999 | Dehmlow et al. |
| 6,002,403 A | 12/1999 | Sugiyama et al. |
| 6,029,195 A | 2/2000 | Herz |
| 6,043,818 A | 3/2000 | Nakano et al. |
| 6,061,055 A | 5/2000 | Marks |
| 6,072,983 A | 6/2000 | Klosterman |
| 6,075,575 A | 6/2000 | Schein et al. |
| 6,078,348 A | 6/2000 | Klosterman et al. |
| 6,081,271 A | 6/2000 | Bardon et al. |
| 6,167,188 A | 12/2000 | Young et al. |
| 6,205,485 B1 | 3/2001 | Kikinis |
| 6,233,389 B1 | 5/2001 | Barton et al. |
| 6,243,039 B1 | 6/2001 | Elliot |
| 6,271,831 B1 | 8/2001 | Escobosa et al. |
| 6,753,849 B1 * | 6/2004 | Curran et al. ............... 345/158 |

FOREIGN PATENT DOCUMENTS

| | | |
|---|---|---|
| WO | WO 00/01149 A1 | 1/2000 |

* cited by examiner

CURSOR CONTROL SYSTEM

This application claims priority to provisional application No. 60/200,817, filed Apr. 27, 2000, entitled "Novel Cursor System" which is hereby incorporated by reference herein.

BACKGROUND OF THE INVENTION

1. Field of the Invention

The present invention relates generally to interaction with televisions and more specifically to control of a cursor on a television utilizing a wireless remote control device.

2. Description of the Related Art

An electronic programming guide on a television can behave in many ways similar to applications on a personal computer. However, televisions do not have cursors and cursor control devices built in as do personal computers. Moreover, the typical user on a couch is not in a position to efficiently use a conventional mouse or trackball. One alternative currently in use is a tiny black ball, integrated as a trackball into an infrared remote control, but this arrangement can be hard to handle. Also, to untrained users, such a device may seem awkward because it lacks the intuitive nature of pointing to an object with the remote control.

Another alternative in current use utilizes selection control arrow keys, which allow a selection highlight in a program to be moved in one of four directions depending on which arrow key is pressed. Again, this lacks the intuitive nature of pointing to an object. Furthermore, objects on the screen may not simply be left, right, up or down from adjacent objects, leading to unexpected jumps in the selection highlight.

Therefore, what may be advantageous is a remote control device that allows a user to point to an object on a television screen and then allows the user to choose the selected object on the television screen.

SUMMARY OF THE INVENTION

A method and apparatus for a novel cursor control system is disclosed. In one embodiment, the invention is a method of manipulating a cursor on a tv screen utilizing a wireless remote control. The method includes detecting a location on the screen pointed to by the remote control. The method also includes Transmitting the location to a set-top box.

BRIEF DESCRIPTION OF THE DRAWINGS

The present invention is illustrated by way of example and not limitation in the accompanying figures.

DETAILED DESCRIPTION

A method and apparatus for a novel cursor control system is described. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments.

A method and apparatus for controlling a cursor using a wireless remote control is described. This method and apparatus uses a detector in the remote control and a processor in a set-top box to determine what the remote control is pointing at, and the set-top box then processes this information to determine where or how to display a cursor on a tv screen or similar display. In one embodiment, a method or apparatus involves a tracking cursor on a screen which moves around as the user moves the remote control. An alternative embodiment employs a method or apparatus which includes a light source allowing a user to grab a cursor from its current location and move it to a desired location. Note that a wireless remote control may take any number of forms, using technology such as infrared, radio, modulated radio frequency, laser, for example. Also, devices such as PDAs using software and possibly utilizing add-on hardware that collectively allow for remote control of a television system may be referred to as wireless remote control devices.

Figure 1:
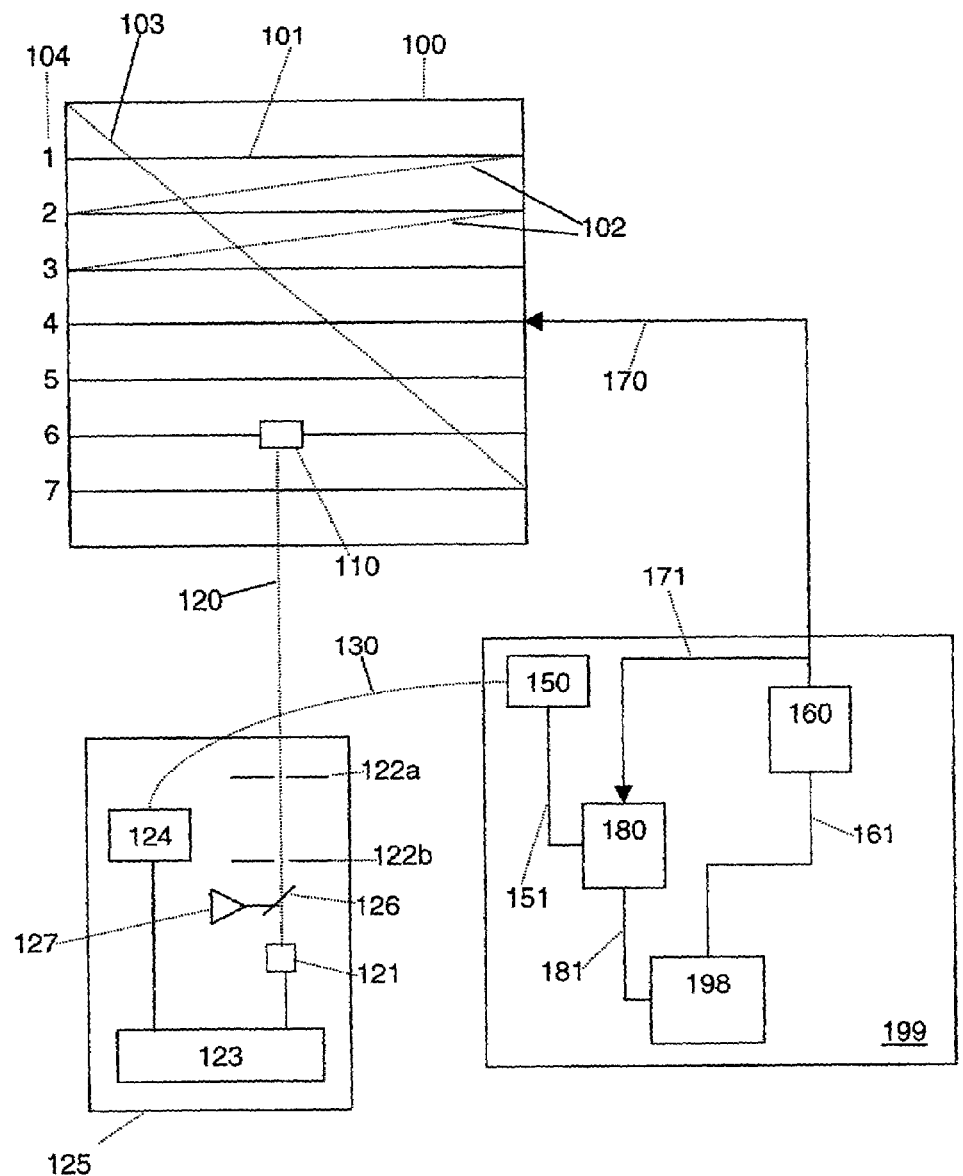
FIG. 1 illustrates an embodiment of a system.

FIG. 1 illustrates an embodiment of a system. This includes screen 100, wireless remote control device 125, and set-top box 199. Screen 100 includes scan lines 101, invisible horizontal retrace lines 102 and invisible vertical retrace lines 103. Symbolically, scan lines are numbered with number set 104. In one embodiment, on line 2 is object 110, that the user would like to choose using remote control 125. Line of sight 120 points to object 110. Sensor 121 in the remote control 125 can sense when the scan of a tv electron beam (or similar scan on other display devices) touches the area of object 110. Additionally, in some embodiments, sensor 121 can sense when the motion of remote control 125 causes the line of sight to cross a boundary in an LCD screen. Accordingly, the location of object 110 may be calculated by timing the scan relative to the Hsync and Vsync signals. However, as this is a wireless remote control, there is no way to supply a pulse representing the scan of the screen at the targeted spot via a wired connection, as had been done in video games for example.

Instead of using wires, the pulse is processed by microcontroller 123 and sent as infrared signal 130 by infrared transmitter 124 to set-top box 199. Set-top box 199 receives the infrared signal in receiver 150 and then uses special controller 180, which may be implemented in either hardware, software, or some combination thereof, to compare the infrared signal 130 to video signal(s) 171. Calculations based on this comparison provide a location 181 which is furnished to a processor 198 (or similar device) to position the cursor as would a normal cursor-positioning signal.

Thus, the system controller 198 (processor) can make the cursor visible by programming video chip 160, which may be a 2-D or 3-D video chip and which supplies video signals 170 to screen 100.

In one embodiment, the tracking cursor moves around the screen in response to the movements of the remote control 125 as detected by the detector 121 (sensor) and processed by the remote control 125 and set-top box 199. In an alternative embodiment, light source 127, for example a laser LED or other light source, is included in the remote control 125. Light source 127 is aimed at semi-mirror 126 which is interposed in the line of sight beam 120 between an aperture in the remote control 125 housing and sensor 121. Blinds 122a and 122b may be included to generate a narrow focus for line of sight beam 120, resulting in greater accuracy both in picking up a signal and in sending a light spot. The light spot may be a red light as used in laser pointers for example. The blinds 122a and 122b are focus elements, and may be implemented with other devices, such as lenses for example. In other embodiments, conventional lens systems may be utilized to accomplish a function similar to that of the focus elements 122a and 122b, such as but not limited to plastic lenses and lens arrays for example.

Figure 2:
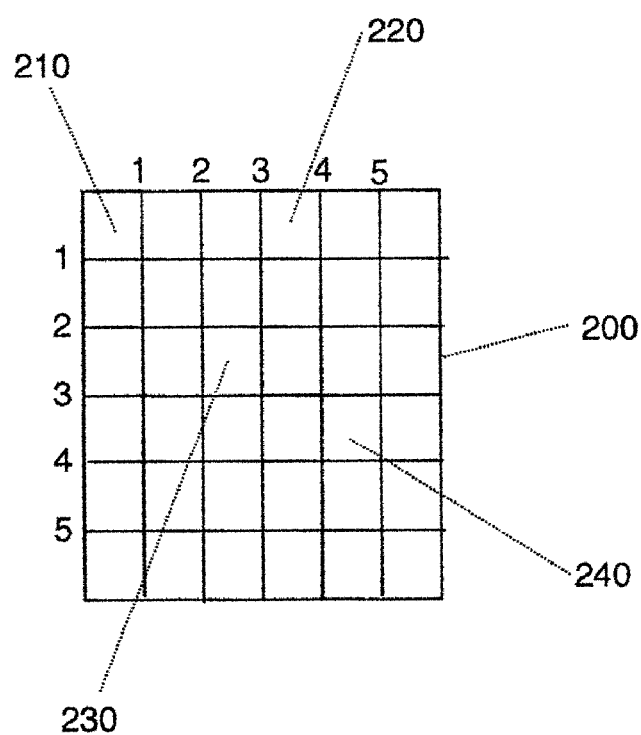
FIG. 2 illustrates an embodiment of an LCD screen.

FIG. 2 illustrates an embodiment of an LCD screen as an example of flat panel technology, which may also include but is not limited to plasma, EL, organic, FET, and other flat panel technologies for example. Those (flat panel) screens do not necessarily use the same scan process used in CRT screens, so other methods of calculating a position may be necessary. Large LCD screens and some other flat panel display technologies do have multiple sectors. In this exemplary illustration, LCD screen 200 is illustrated with sector boundaries numbered 1–5 in the horizontal and vertical directions. In the numbering scheme illustrated, a sector may be addressed with a pair of coordinates, first a horizontal, then a vertical coordinate. Thus, sector 210 has coordinates 1,1. Similarly, sector 220 has coordinates 1,4, sector 230 has coordinates 3,3 and sector 240 has coordinates 4,5. As illustrated, the coordinates correspond to the righthand and bottom boundaries of the sector. However, other numbering schemes and addressing schemes may be utilized to uniquely identify sectors on an LCD. It will be appreciated that other, similar approaches may be applied depending on actual screens connected. In some cases the user may have to go through a setup or initialization routine to configure the system to the correct type of screen.

With LCD screens and/or projector screens, the user may have to grab the cursor (such as with a light spot) and move the cursor, with transitions across sector boundaries detected to track motion for example. The implied track of motion may be displayed based on which sector boundaries are crossed. The processing involved in such a system may be accomplished in controller 180 for example. As will be appreciated, controller 180 may be a piece of software used with processor 198, specialized hardware, or some combination of the two. Furthermore, as will be appreciated, the infrared system including elements 124, 130 and 150 may alternatively be implemented as a wireless system using radio-frequency transmission or inductive transmission for example.

Figure 3:
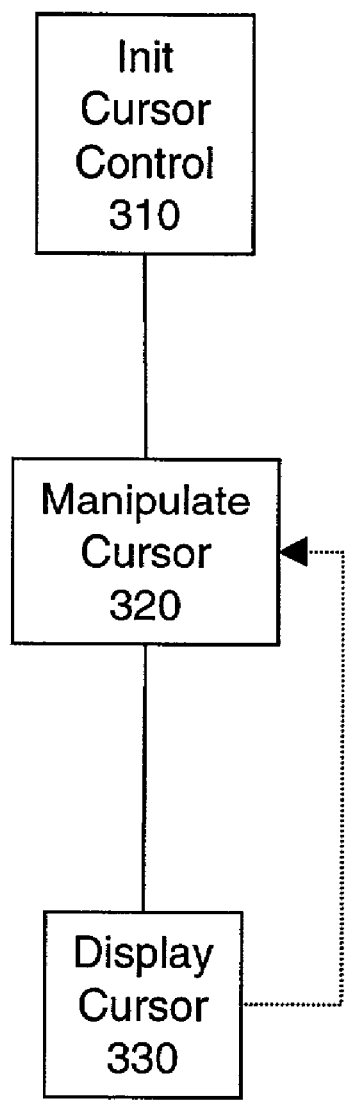
FIG. 3 provides a flow diagram illustrating an embodiment of a process.

FIG. 3 provides a flow diagram illustrating an embodiment of a process. This process, in one embodiment, illustrates a process of utilizing a remote control device to operate a cursor on a tv screen. At block 310, the cursor and remote control device are initialized with respect to the system. At block 320, the cursor is manipulated by the remote control device, such as moving the cursor or selecting an item pointed to by the cursor. At block 330, the cursor is displayed by the system in accordance with the manipulations actually detected by the system. Some manipulations, such as moving the cursor around in an area not corresponding to the screen may not be detected by the system, thus leading to no display of changes in the cursor. The manipulation and display portions of the process may be repeated, and, at times, the initialization process may be repeated.

Figure 4:
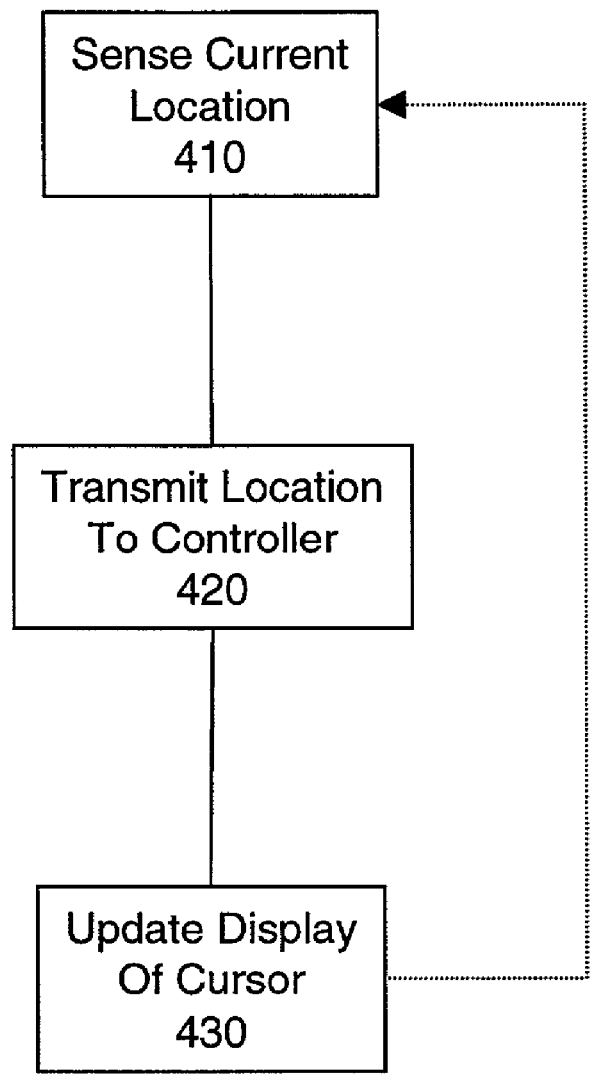
FIG. 4 provides a flow diagram illustrating an alternate embodiment of a process.

FIG. 4 provides a flow diagram illustrating an alternate embodiment of a process. In one embodiment, the process illustrated relates to the process of sensing and updating the cursor location. At block 410, the current location of the cursor is sensed, such as by the method described with respect to FIG. 1 previously. At block 420, the location of the cursor is transmitted to the controller, either as some form of explicit location, or as an indication of when a synchronizing signal was sensed. At block 430, the display of the cursor is updated based on the location transmitted at block 420. This process may be repeated as long as the system is active.

Figure 5:
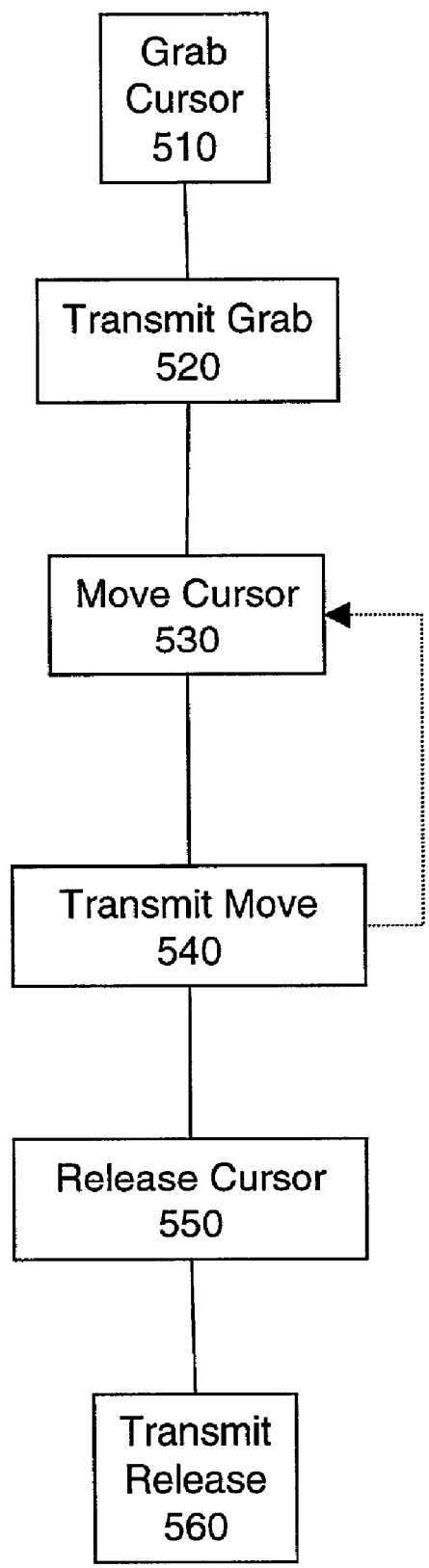
FIG. 5 provides a flow diagram illustrating another alternate embodiment of a process.

FIG. 5 provides a flow diagram illustrating another alternate embodiment of a process. At block 510, the cursor is grabbed, such as by having the remote control device pointed at the cursor (as illustrated by a light spot for example) and selecting the cursor for example. At block 520, the grab of the cursor is transmitted to the set-top box, thus informing it that the cursor is to be monitored. At block 530, the cursor is moved, such as by moving the remote control until it points at another portion of the screen. At block 540, the movement of the cursor is transmitted to the set-top box, thus allowing for an update of the display of the cursor's position and potential detection of changes in what the cursor may select. This move and transmit portion of the process may be repeated and may occur over various time intervals, leading to either smooth motion of a cursor or jumps in the cursor's apparent location on the display. At block 550, the cursor is released by the user, such as by explicitly releasing the cursor. At block 560, the release is transmitted to the set-top box, thus allowing it to stop monitoring the cursor movements. As will be appreciated, the release need not be explicit, it may be implicit in other processes within the remote control device or the set-top box. For example, selection of an entry on a display may trigger an automatic release, as may expiration of a timer at a predetermined time after either a grab or a last move of the cursor. Such implicit releases may be detected or determined in the set-top box, eliminating the need for transmission, or may be detected or determined in the remote control device and transmitted to the set-top box.

Figure 6:
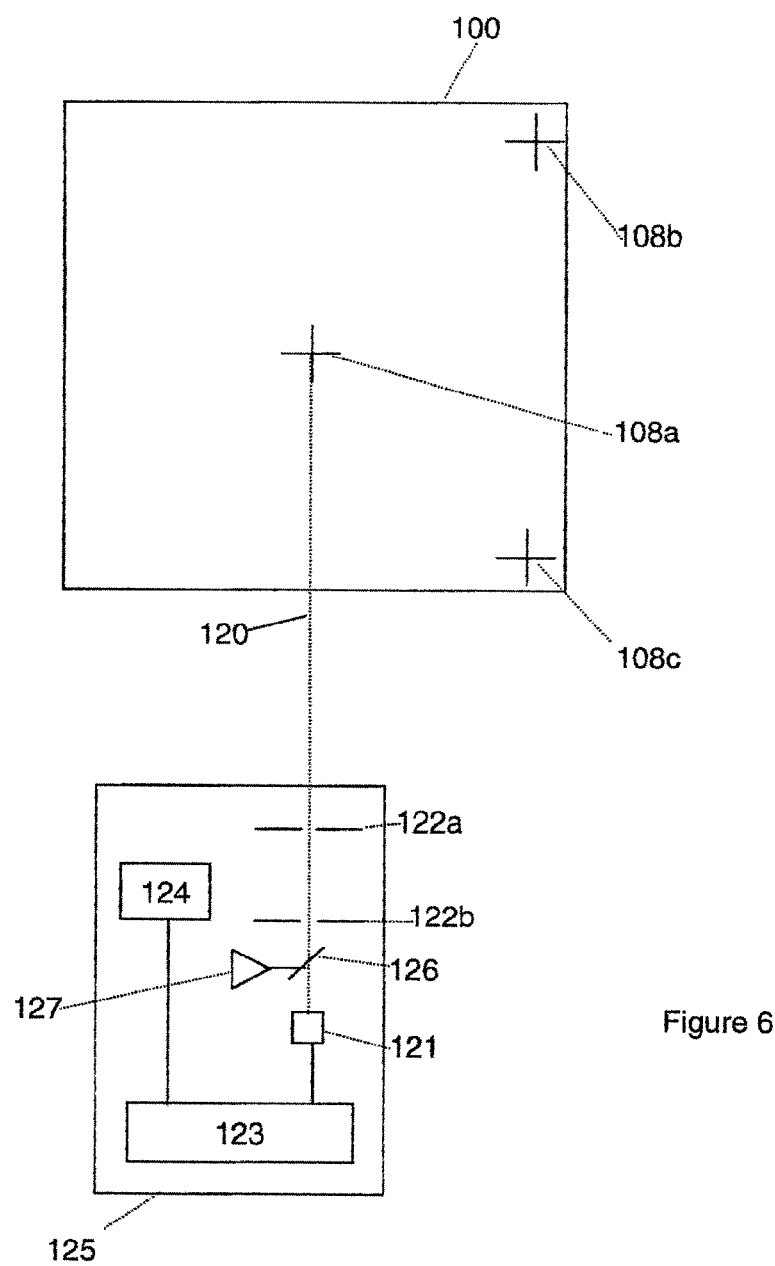
FIG. 6 illustrates additional aspects of the embodiment of the system of FIG. 1.

FIG. 6 illustrates additional aspects of the embodiment of the system of FIG. 1. Initialization of the system may be important to properly tracking movement of the cursor, and may depend on various environmental and system variables. As a result, determination of delays or latencies in processor 123, transmitter 124 and receiver 150 among other components (or paths such as line of sight 120 and transmission 130) in the embodiment of FIG. 1 may be necessary. As illustrated, line of sight 120 is pointed at target 108A which is displayed on screen 100 along with targets 108B and 108C. By pointing at the targets in a predetermined sequence or as instructed to by the system, the user may synchronize the system and allow for measurement of the delays in the system. Effectively, the system may be calibrated. Note that the number and position of the targets is important only to the extent that they are known in advance for calculation purposes. Furthermore, correlation and calibration may be accomplished in a variety of ways, which may include other methods such as dynamically passing the remote control over a given part of the screen. Moreover, correlation may also involve selecting targets or releasing targets in systems utilizing such features.

Figure 7:
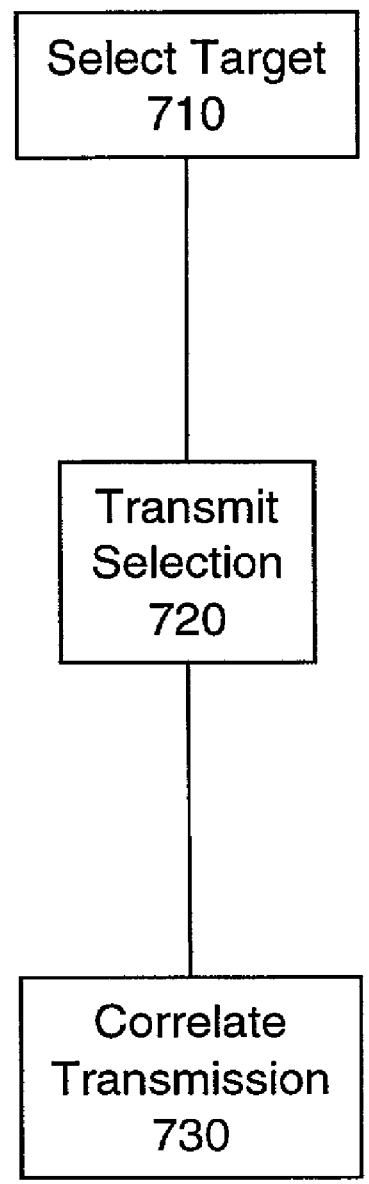
FIG. 7 provides a flow diagram illustrating yet another alternate embodiment of a process.

FIG. 7 provides a flow diagram illustrating yet another alternate embodiment of a process. At block 710, a target is selected or pointed to. At block 720, the selection is transmitted, or alternatively the detected location is transmitted. At block 730, the transmission is correlated to known signals within a set-top box, resulting in a determination of expected delays between an action at the remote control device and receipt of a corresponding transmission at the set-top box.

Figure 8:
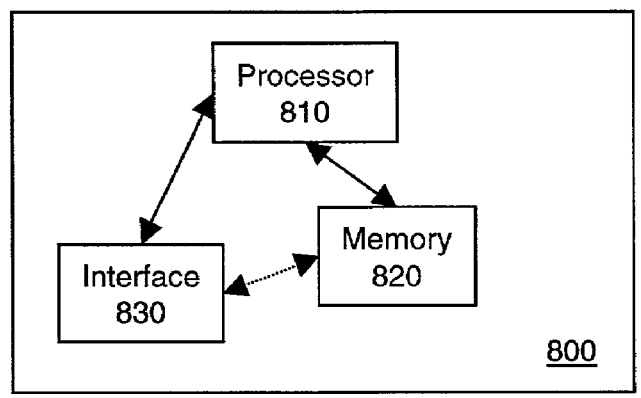
FIG. 8 illustrates an embodiment of a machine which may be used to implement one or more components of a system.

FIG. 8 illustrates an embodiment of a machine which may be used to implement one or more components of a system. For example, the machine may implement the set-top box or the remote control with suitable changes or enhancements. The machine 800 includes a processor 810, a memory 820 coupled to the processor 810 and an interface 830 coupled to the processor 810. As will be appreciated, multiple processors 810, memories 820 and interfaces 830 may be included in a machine 800, and the processors 810, memories 820, and interfaces 830 may be implemented in a variety of ways, such that a processor 810 may be implemented as a general processor, or as a video processor such as that described earlier with respect to FIG. 1. Moreover, it will be appreciated that a memory 820 may be expected to contain one or more of data or instructions suitable for use by the processor 810. Additionally, the processor 810, when executing instructions from the memory 820, may be expected to perform a method associated with those instructions. Memory 820 may be implemented as one or more of a variety of media such as those described later in this description.

Some portions of the detailed description are presented in terms of algorithms and symbolic representations of operations on data bits within a computer memory. These algorithmic descriptions and representations are the means used by those skilled in the art to most effectively convey the substance of their work to others skilled in the art. An algorithm as described here is generally conceived to be a self consistent sequence of acts or operations leading to a desired result. The acts are those requiring physical manipulations of physical quantities. Usually, though not necessarily, these quantities take the form of electrical or magnetic signals capable of being stored, transferred, combined, compared and otherwise manipulated. It has proven convenient at times principally for reasons of common usage to refer to these signals as bits, values, elements, symbols, characters, terms, numbers, data or the like.

It should be borne in mind, however, that all of these in similar terms are to be associated with the appropriate physical quantities and are merely convenient labels applied to these quantities. Unless specifically stated otherwise as apparent from the following discussion it is appreciated that throughout the description discussions utilizing terms such as "processing" or "computing" or "calculating" or "determining" or "displaying" or the like refer to the action and processes of a computer system or similar electronic computing device that manipulates and transforms data represented as physical (electronic) quantities within the computer systems registers and memories into other data similarly represented as physical quantities within the computer system memories or registers or other such information storage transmission or display devices. The present invention can be implemented by an apparatus for performing the operations herein. This apparatus may be specially constructed for the required purposes or it may comprise a machine such as a general purpose computer selectively activated or reconfigured by a computer program stored in the computer. Such a computer program may be stored in a computer readable storage medium such as but not limited to any type of disk including floppy disks, optical disks, CD roms and magnetic optical disks, read only memories, random access memories, EPROMS, EEPROMS, magnetic or optical cards or any type of media suitable for storing electronic constructions and each coupled to a computer system bus. Each of these media may be coupled to a computer system bus through use of an appropriate device for reading and or writing the media in question. Specialty apparatus may include a collection of readily available pieces or an application specific integrated circuit including a series of logic blocks for example. The blocks of FIGS. 7 or 8 may be suitable for implementation as logic blocks, as may other configurations of the method, system and apparatus described herein.

The algorithms and displays presented herein are not inherently related to any particular computer or other apparatus. Various general purpose systems may be used with programs in accordance with the teachings herein or it may prove convenient to construct more specialized apparatus to perform the required method. For example, any of the methods according to the present invention can be implemented in hard wired circuitry by programming a general purpose processor or by any combination of hardware and software. One of skill in the art will immediately appreciate that the invention can be practiced with computer system configuration. Configurations other than those described below including hand held devices, multi processor systems, microprocessor based or programmable consumer electronics, network PCs, mini computers, main frame computers and the like. The invention may also be practiced in distributed computing environments or tasks or performed by remote processing devices that are linked through a communications network. The required structure for a variety of these systems will appear from the description below.

The methods of the invention may be implemented using computer software. If written in a programming language conforming to a recognized standard sequences of instructions designed to implement the methods can be compiled for execution on a variety of hardware platforms or machines and for interface to a variety of operating systems. In addition the present invention is not described with reference to any particular programming language. It will be appreciated that a variety of programming languages may be used to implement the teachings of invention as described herein. Furthermore, it is common in the art to speak of software in one form or another (for example program procedure application etc . . . ) as taken in action or causing a result. Such expressions are merely a shorthand way of saying that execution of the software by a computer causes the processor of the computer to perform an action or produce a result.

In the foregoing detailed description, the method and apparatus of the present invention has been described with reference to specific exemplary embodiments thereof. It will, however, be evident that various modifications and changes may be made thereto without departing from the broader spirit and scope of the present invention. In particular, the separate blocks of the various block diagrams represent functional blocks of methods or apparatuses and are not necessarily indicative of physical or logical separations or of an order of operation inherent in the spirit and scope of the present invention. For example, the various blocks of FIG. 1 (for example) may be integrated into components, or may be subdivided into components. Similarly, the blocks of FIG. 4 (for example) represent portions of a method which, in some embodiments, may be reordered or may be organized in parallel rather than in a linear or step-wise fashion. The present specification and figures are accordingly to be regarded as illustrative rather than restrictive.

What is claimed is:

1. A remote control device comprising:
   a housing having an aperture:
   a sensor within the housing, coupled to the housing at a location within an optical path from the aperture;
   a microcontroller electrically coupled to the sensor and coupled to the housing;
   a transmitter electrically coupled to the microcontroller and coupled to the housing;
   a semi-mirror coupled to the housing and disposed within the optical path from the aperture between the aperture and the sensor; and
   a light source coupled to the housing and disposed in a position relative to the semi-mirror suitable for emitting a light beam targeted at the semi-mirror which, upon reflection by the semi-mirror, follows the optical path from the semi-mirror to the aperture.

2. The remote control device of claim 1, further comprising:
   a first focus element disposed in the optical path between the semi-mirror and the aperture.

3. The remote control device of claim 2, further comprising:
   a second focus element disposed in the optical path between the semi-mirror and the first focus element.

4. The remote control device of claim 3 wherein:
   the light source is a laser LED;
   the first focus element is a blind; and
   the second focus element is a blind.

* * * * *